(12) United States Patent
Stoller et al.

(10) Patent No.: US 11,308,943 B2
(45) Date of Patent: Apr. 19, 2022

(54) SYSTEMS AND METHODS FOR ALIGNING LYRICS USING A NEURAL NETWORK

(71) Applicant: Spotify AB, Stockholm (SE)

(72) Inventors: Daniel Stoller, London (GB); Simon René Georges Durand, London (GB); Sebastian Ewert, London (GB)

(73) Assignee: Spotify AB, Stockholm (SE)

( * ) Notice: Subject to any disclaimer, the term of this patent is extended or adjusted under 35 U.S.C. 154(b) by 123 days.

(21) Appl. No.: 16/569,372

(22) Filed: Sep. 12, 2019

(65) Prior Publication Data

US 2020/0135176 A1 Apr. 30, 2020

Related U.S. Application Data

(60) Provisional application No. 62/752,296, filed on Oct. 29, 2018.

(51) Int. Cl.
| | | |
|---|---|---|
| *G10L 15/183* | (2013.01) | |
| *G06F 17/16* | (2006.01) | |
| *G06F 17/18* | (2006.01) | |
| *G06N 3/08* | (2006.01) | |
| *G10L 15/16* | (2006.01) | |

(Continued)

(52) U.S. Cl.
CPC ............ *G10L 15/183* (2013.01); *G06F 16/63* (2019.01); *G06F 17/16* (2013.01); *G06F 17/18* (2013.01); *G06N 3/08* (2013.01); *G10L 15/16* (2013.01); *G10L 2015/088* (2013.01)

(58) Field of Classification Search
CPC ....... G10L 15/16; G10L 25/30; G10L 15/197; G10L 17/18; G10L 15/183; G10L 2015/088; G10L 2015/226; G10L 15/26; G06F 16/7844; G06F 17/16; G06F 40/20; G06F 40/284; G06F 40/216; G06F 40/289; G06F 16/63; G06F 17/18; G06N 3/08

See application file for complete search history.

(56) References Cited

U.S. PATENT DOCUMENTS

| | | |
|---|---|---|
| 8,719,024 B1 | 5/2014 | Moreno et al. |
| 9,305,530 B1 | 4/2016 | Durham et al. |
| 9,646,634 B2 * | 5/2017 | Sainath ............... G06N 3/0481 |

(Continued)

OTHER PUBLICATIONS

Jansson et al, Singing Voice Separation With Deep U-Net Convolutional networks, Oct. 23-278, 2007, Proceedings of the 18th ISMIR Conference, pp. 745-751 (Year: 2017).*

(Continued)

*Primary Examiner* — Linda Wong
(74) *Attorney, Agent, or Firm* — Morgan, Lewis & Bockius LLP

(57) ABSTRACT

An electronic device receives audio data for a media item. The electronic device generates, from the audio data, a plurality of samples, each sample having a predefined maximum length. The electronic device, using a neural network trained to predict character probabilities, generates a probability matrix of characters for a first portion of a first sample of the plurality of samples. The probability matrix includes character information, timing information, and respective probabilities of respective characters at respective times. The electronic device identifies, for the first portion of the first sample, a first sequence of characters based on the generated probability matrix.

17 Claims, 7 Drawing Sheets

(51) Int. Cl.
*G10L 15/08* (2006.01)
*G06F 16/63* (2019.01)

(56) References Cited

U.S. PATENT DOCUMENTS

| | | | |
|---|---|---|---|
| 2011/0054910 A1 | 3/2011 | Fujihara et al. | |
| 2011/0288862 A1* | 11/2011 | Todic | G10H 1/368 |
| | | | 704/235 |
| 2016/0217367 A1* | 7/2016 | Moreno | G10L 15/16 |
| 2018/0061439 A1 | 3/2018 | Diamos et al. | |
| 2018/0174576 A1 | 6/2018 | Hagen et al. | |
| 2019/0115013 A1* | 4/2019 | Bengio | G10L 15/16 |

OTHER PUBLICATIONS

Mesaros et al, Automatic Recognition of Lyrics of Singing, Hindawi Publishing Corporation EURASIP Journal on Audio, Speech, and Music Processing, Nov. 23, 2009, vol. 2010, pp. 1-11 (Year: 2009).*

Doire, Online Singing Voice Separation Using a Recurrent 1-Dimensional U-Net Trained with Deep Feature Losses, 2019, IEEE ICASSP 2019, pp. 3752-3756 (Year: 2019).*

Grzywalski et al, Application of recurrent U-NET architecture to speech enhancement, Sep. 19-21, 2018, Singal Processing Algorithms, Architecture, Arrangements, and Applications IEEE CAS, pp. 82-87 (Year: 2018).*

Oh et al, Spectrogram Channels U-Net: A source separation model viewing each channel as the spectrogram of each source, https://arxiv.org/abs/1810.11520, Oct. 26, 2018, pp. 1-5 (Year: 2018).*

Spotify AB, Summons to Attend Oral Proceedings Pursuant to Rule 115(1), EP19205617.4, dated Oct. 19, 2020, 9 pgs.

Faille, Using Deep Learning to Annotate Karaoke Songs, Semester Thesis, submitted Jan. 7, 2018, Distributed Computing Group, Computer Engineering and Networks Laboratory, ETH Zürich, 30 pgs.

Gupta, Chitralekha et al., "Semi-supervised Lyrics and Solo-singing Alignment," Proceedings of the 19th ISM1R Conference, Sep. 23, 2018, 8 pgs.

Kruspe, Anna M., "Bootstrapping a System for Phoneme Recognition and Keyword Spotting in Unaccompanied Singing," 17th International Socitey for Musicn Information Retrieva Conference, Aug. 7, 2016, 7 pgs.

Parisi et al., Exploiting Synchronized Lyrics and Vocal Features for Music Emotion Detection, arXiv: 1901.04831v1 [cs.CL] Jan. 15, 2019, 9 pgs.

Stoller, Daniel et al., "End-to-end Lyrics Alignment for Polyphonic Music Using an Audio-to-Character Recognition Model," Cornell University Library, Feb. 18, 2019, 5 pgs.

Spotify AB, Extended European Search Report, EP19205617.4, dated Feb. 26, 2020, 10 pgs.

Spotify AB, Communication Pursuant Article 94(3), EP19205617.4, dated Jul. 13, 2020, 4 pgs.

Spotify AB, Extended European Search Report, EP19213434.4, dated Mar. 4, 2020, 11 pgs.

Watanabe et al., A Melody-conditioned Lyrics Language Model, Proceedings of NAACL-HLT 2018, © 2018 Association for Computtational Linguistics, 10 pgs.

Wong, Automatic Lyric Alignment in Cantonese Popular Music, Thesis Master of Philosophy, submitted Oct. 2005, © The Chinese Universty of Hong Kong 115 pgs.

* cited by examiner

SYSTEMS AND METHODS FOR ALIGNING LYRICS USING A NEURAL NETWORK

RELATED APPLICATION

This application claims priority to U.S. Provisional Application No. 62/752,296, filed Oct. 29, 2018, which is hereby incorporated by reference in its entirety.

TECHNICAL FIELD

The disclosed embodiments relate generally to media playback, and, in particular, to using a neural network to identify lyrics that correspond to audio data.

BACKGROUND

Access to electronic media, such as music and video content, has expanded dramatically over time. As a departure from physical media, media content providers stream media to electronic devices across wireless networks, improving the convenience with which users can digest and experience such content.

Media content streamed to users frequently includes music with lyrical content. A media content provider may enhance provided media content by making lyrical content available. Typically, providing lyrical content involves obtaining a manually transcribed set of lyrics for a song. However, manually transcribed lyrics may be unavailable or costly to obtain. Further, manually transcribed lyrics lack information indicating how the lyrics align in time with the song.

SUMMARY

Accordingly, there is a need for systems and methods for using a neural network to identify lyrics within audio data.

Lyrics enable interacting with music in a plenitude of ways. For example, one can search for a song if the title of the song is unknown. Determining time-aligned lyrics (e.g., times at which portions of the lyrics of a song occur relative to the non-lyrical music content of the song) enables navigation within the song, presentation of backing music and lyrics for karaoke, and removal of explicit content from the song.

In accordance with some embodiments, a method is performed at a first electronic device. The first electronic device has one or more processors and memory storing instructions for execution by the one or more processors. The method includes receiving audio data for a media item. The method further includes generating, from the audio data, a plurality of samples, each sample having a predefined maximum length. The method further includes using a neural network trained to predict character probabilities and generating a probability matrix of characters for a first portion of a first sample of the plurality of samples. The probability matrix includes character information, timing information, and respective probabilities of respective characters at respective times. The method includes identifying, for the first portion of the first sample, a first sequence of characters based on the generated probability matrix.

In some embodiments, generating the matrix using the neural network comprises convolving the first sample, downsampling the first sample to reduce a dimension of the first sample, and, after downsampling the first sample, upsampling the first sample to increase the dimension of the first sample.

In some embodiments, identifying the first sequence of characters includes receiving, from an external source, lyrics corresponding to the media item, and, using the received lyrics and the probability matrix, aligning characters in the first sequence of characters with the received lyrics corresponding to the media item.

In some embodiments, the method further includes determining a set of lyrics based on the first sequence of characters and storing the set of lyrics in association with the media item.

In some embodiments, the method further includes, using a language model and at least a portion of the first sequence of characters, determining a first word in the first portion of the first sample. The method further includes determining, using the timing information that corresponds to the first portion of the first sample, a time that corresponds to the first word.

In some embodiments, the method includes generating a plurality of probability matrices for a plurality of samples using the neural network, and concatenating a set of two or more of the generated probability matrices to create a single probability matrix, the single probability matrix including character information, timing information, and respective probabilities of respective characters at respective times.

In some embodiments, the received audio data includes an extracted vocal track that has been separated from a media content item.

In some embodiments, the received audio data is a polyphonic media content item.

In some embodiments, the method further includes receiving, from a user, a request to search for a second sequence of characters within the media item. In response to receiving the request to search for the sequence of characters, the method includes performing a search of the first sequence of characters to determine whether at least a portion of the first sequence of characters matches the second sequence of characters. In accordance with a determination that at least a portion of the first sequence of characters matches the second sequence of characters, the method includes identifying timing information related to the portion that matches.

In some embodiments, the method includes identifying, from the first sequence of characters, one or more keywords associated with the media item.

In some embodiments, the method includes determining whether any of the one or more keywords corresponds to a defined set of words. In accordance with a determination that a first keyword of the one or more keywords corresponds to the defined set of words, the method includes performing an operation on a portion of the sample that corresponds to the first keyword.

In accordance with some embodiments, a first electronic device (e.g., a server system, a client device, etc.) includes one or more processors and memory storing one or more programs configured to be executed by the one or more processors. The one or more programs further include instructions for receiving audio data for a media item and generating, from the audio data, a plurality of samples, each sample having a predefined maximum length. The one or more programs further include instructions for using a neural network trained to predict character probabilities and generating a probability matrix of characters for a first portion of a first sample of the plurality of samples. The probability matrix includes character information, timing information, and respective probabilities of respective characters at respective times. The one or more programs further include instructions for identifying, for the first portion of the first sample, a first sequence of characters based on the generated probability matrix.

In accordance with some embodiments, a computer-readable storage medium has stored therein instructions that, when executed by an electronic device, cause the first electronic device to receive audio data for a media item and generate, from the audio data, a plurality of samples, each sample having a predefined maximum length. The instructions further cause the first electronic device to, using a neural network trained to predict character probabilities, generate a probability matrix of characters for a first portion of a first sample of the plurality of samples. The probability matrix includes character information, timing information, and respective probabilities of respective characters at respective times. The instructions further cause the electronic device to identify, for the first portion of the first sample, a first sequence of characters based on the generated probability matrix.

Thus, systems are provided with improved methods for providing information associated with media content items based on a proxy media content item.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

DETAILED DESCRIPTION

Figure 1:
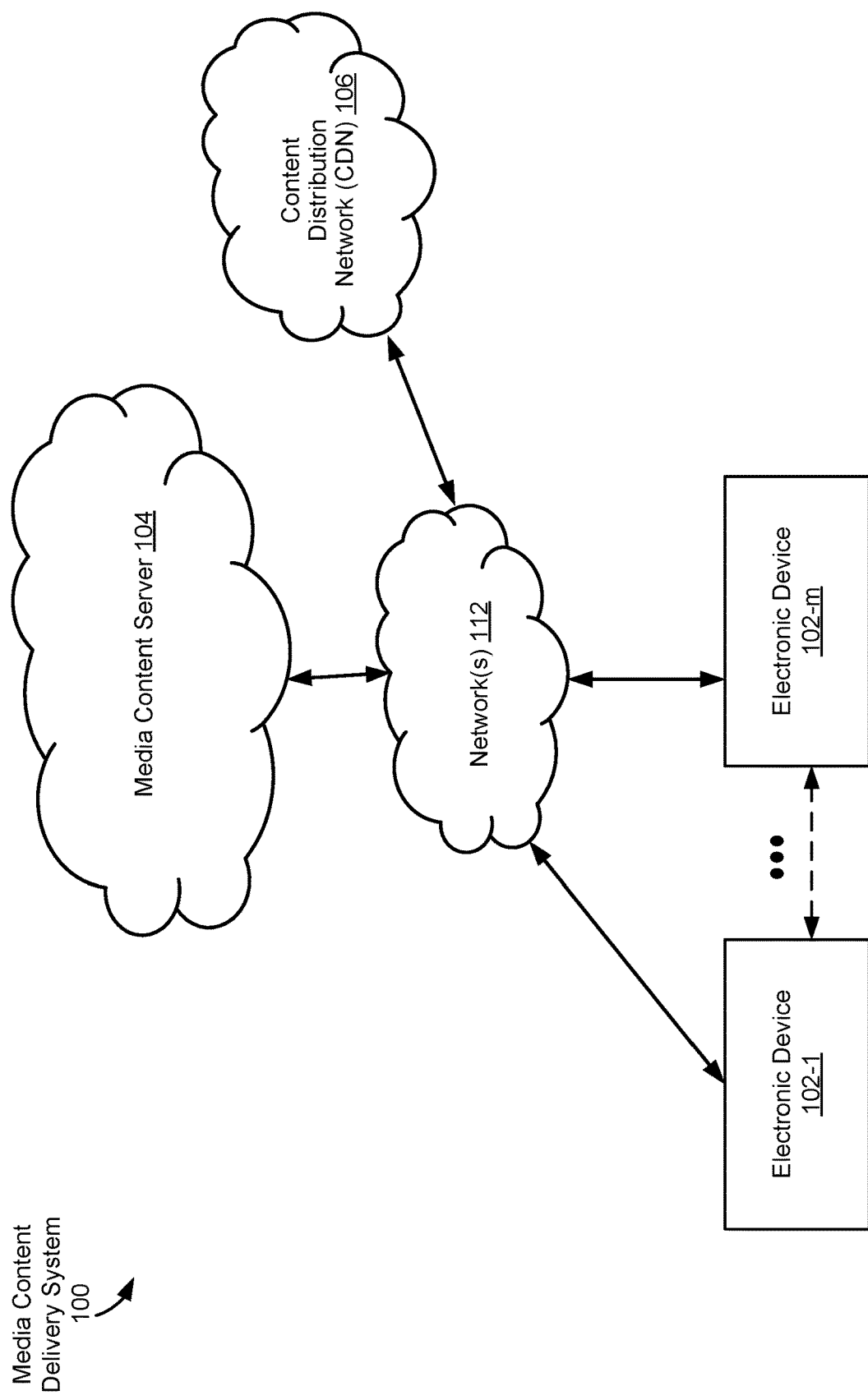
FIG. 1 is a block diagram illustrating a media content delivery system, in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

In some embodiments described herein, a system inputs audio data, such as an audio waveform, into a neural network to identify lyrics contained in the audio data. The identified lyrics can then be time-aligned with the audio data. The neural network outputs a character probability matrix that predicts characters directly from the audio data. The character probabilities are used to generate and time-align the lyrics. Possible applications for the system include creating a singalong or karaoke experience using the time-aligned lyrics, searching the lyrics, navigating to a time within the audio based on a lyric, extracting keywords or recommendations, and automatically editing particular words from the lyrics.

FIG. 1 is a block diagram illustrating a media content delivery system 100, in accordance with some embodiments. The media content delivery system 100 includes one or more electronic devices 102 (e.g., electronic device 102-1 to electronic device 102-*m*, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, an electronic device 102 is a headless client. In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, movies, videos, or other media items, or playlists thereof) to media content server 104 through network(s) 112. Additionally, electronic devices 102-1 and 102-m, in some embodiments, also send indications of media content items to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. For example, content (also referred to herein as "media items," "media content items," and "content items") is received, stored, and/or served by the CDN 106. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
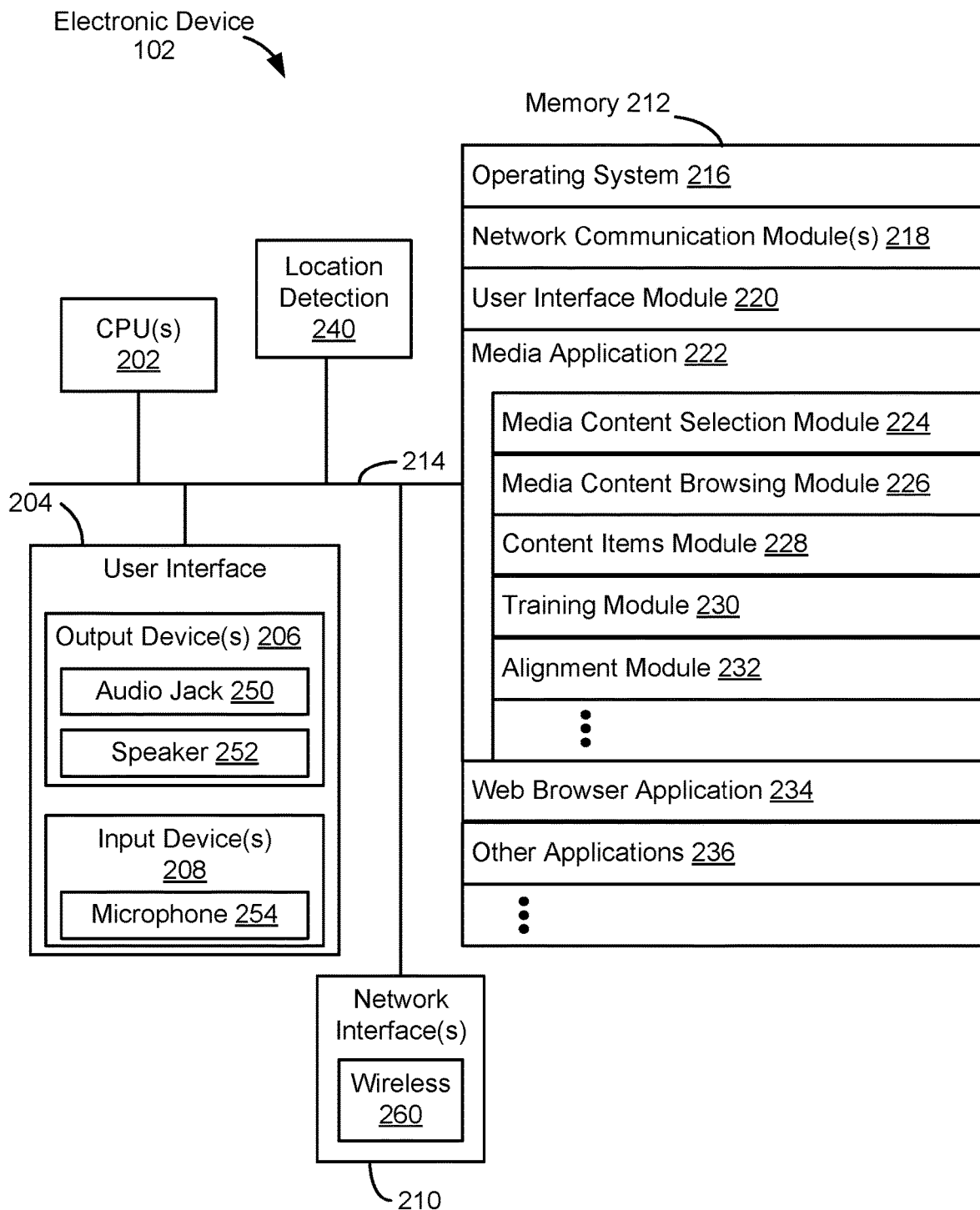
FIG. 2 is a block diagram illustrating a client device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone 254 and voice recognition device to supplement or replace the keyboard. Optionally, the electronic device 102 includes an audio input device (e.g., a microphone 254) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, and/or or other wireless (e.g., Bluetooth-compatible) devices (e.g., for streaming audio data to the electronic device 102 of an automobile). Furthermore, in some embodiments, the wireless interface 260 (or a different communications interface of the one or more network interfaces 210) enables data communications with other WLAN-compatible devices (e.g., electronic device(s) 102) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:
- an operating system 216 that includes procedures for handling various basic system services and for performing hardware-dependent tasks;
- network communication module(s) 218 for connecting the electronic device 102 to other computing devices (e.g., other electronic device(s) 102, and/or media content server 104) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:
  - a media content selection module 224 for selecting one or more media content items and/or sending, to the media content server, an indication of the selected media content item(s);
  - a media content browsing module 226 for providing controls and/or user interfaces enabling a user to navigate, select for playback, and otherwise control or interact with media content, whether the media content is stored or played locally or remotely;
  - a content items module 228 for processing uploaded media items and storing media items for playback and/or for forwarding to the media content server;
  - a training module 230 for storing training data and/or training a neural network model; and
  - an alignment module 232 for aligning, over a period of time, sequences of characters (e.g., lyrics) with audio portions of a media content item during the period of time.
- a web browser application 234 (e.g., Internet Explorer or Edge by Microsoft, Firefox by Mozilla, Safari by Apple, or Chrome by Google) for accessing, viewing, and interacting with web sites; and
- other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
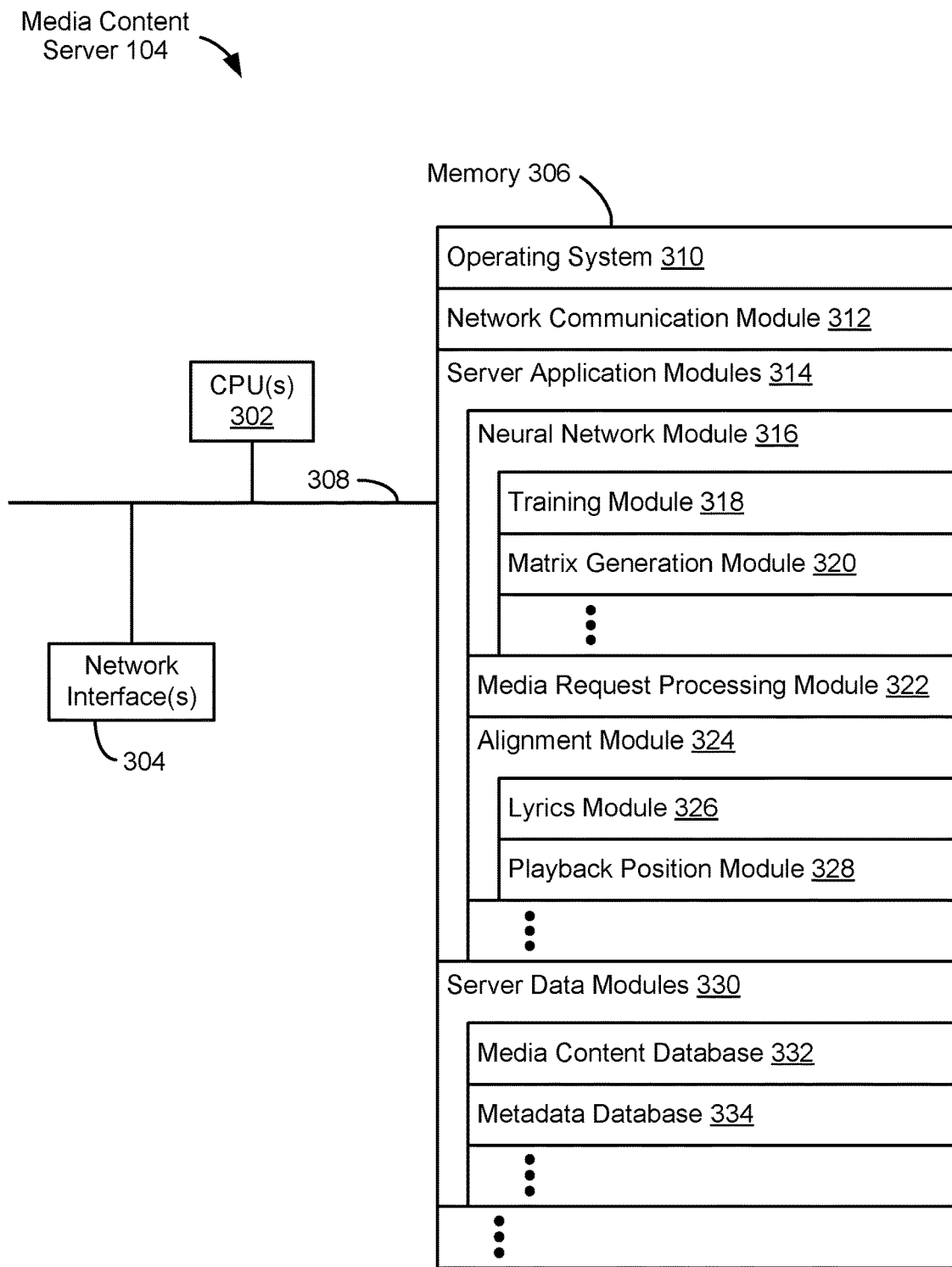
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 including, but not limited to, one or more of:
  - a neural network module 316 for training and/or storing a neural network, the neural network module 316 including, but not limited to, one or more of:
    - a training module 318 for training, using training data, the neural network; and
    - a matrix generation module 320 for generating and/or storing one or more character probability matrices; and
  - a media request processing module 322 for processing requests for media content and facilitating access to requested media items by electronic devices (e.g., the electronic device 102) including, optionally, streaming media content to such devices;
  - an alignment module 324 for aligning lyrics with audio output of a media content item, including, but not limited to, one or more of:
    - a lyrics module 326 for storing and/or displaying, to an electronic device, lyrics associated with a media content item; and
    - a playback position module 328 for processing (e.g., identifying and/or providing to the electronic device) timing information related to playback of a media content item such that the lyrics stored at lyrics module 326 are time-aligned (for display) with playback of audio data for the media content item;
- one or more server data module(s) 330 for handling the storage of and/or access to media items and/or metadata relating to the media items; in some embodiments, the one or more server data module(s) 330 include:
  - a media content database 332 for storing media items;
  - a metadata database 334 for storing metadata relating to the media items; and
  - a key database 336 for storing keys related to account information for user media accounts, such as user profiles, credentials (e.g., user identifiers, passwords, email addresses, etc.), and/or identifiers of any linked accounts.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above. In some embodiments, memory 212 stores a subset or superset of the respective modules and data structures described with regard to memory 306. In some embodiments, memory 306 stores a subset or superset of the respective modules and data structures described with regard to memory 212.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4:
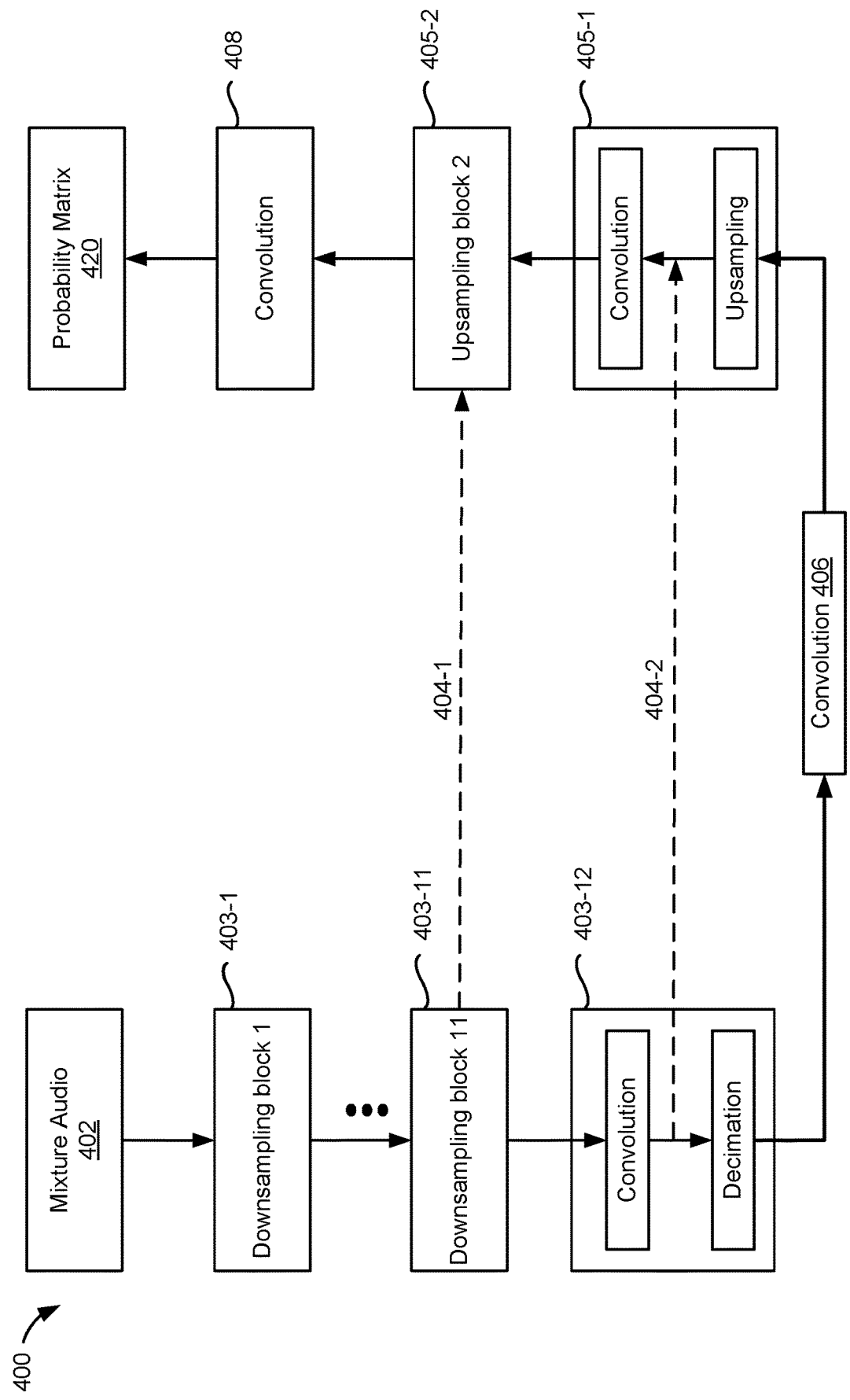
FIG. 4 is a block diagram illustrating a neural network model for generating a probability matrix, in accordance with some embodiments.

FIG. 4 is a block diagram illustrating a system 400 for generating a probability matrix, in accordance with some embodiments.

In some embodiments, the system 400 comprises a neural network (e.g., a U-Net). In some embodiments, the system uses the neural network to transform mixture audio 402 (e.g., a mixture of vocal and non-vocal content) to a probability matrix 420. In some embodiments, the mixture audio is stored in media content database 332. In some embodiments, the mixture audio is stored as content items 228. In some embodiments, the neural network processes content as it is added to the database and/or in response to a request to process a particular media content item. For example, a user inputs a request for a transcription of a content item (e.g., selected from content items 228 and/or from content stored in media content database 332). In response to receiving the request from the user, the system 400 retrieves mixture audio 402 (e.g., from the requested content item), and puts the mixture audio 402 through the neural network (e.g., downsampling and upsampling) shown in system 400. For example, the system 400 outputs a matrix of probability characters (e.g., including letters and spaces). In some embodiments, the matrix of probability characters is used to generate lyrics corresponding to the mixture audio 402.

In some embodiments, the system receives mixture audio 402 as an input to the system 400. In some embodiments, mixture audio 402 comprises an audio waveform (e.g., a digital audio signal). In some embodiments, mixture audio 402 comprises a sample of a media content item. For example, mixture audio 402 comprises a 15-second clip (e.g., sample) of a first media content item. In some embodiments, the system 400 generates a probability matrix 420 for a portion of the sample (e.g., only the middle 10-seconds of the 15-second clip), as described below with reference to FIG. 5.

In some embodiments, the length of the sample is based on the processing power of the system, the memory stored into the model, and/or the granularity of lyrics data used to train the system. For example, the length of the sample corresponds to the length of the clips used to train the model. If the data accessible to train the model comprises 15-second clips of lyrics are available to train the model, the length of the sample is selected to be 15-second clips. In some embodiments, the length of the samples used to train the model represents a maximum length of samples that are fed into system 400. For example, samples that are shorter than the length of the training samples can be fed into system 400.

In some embodiments, a probability matrix is generated for only a portion of the sample (e.g., the middle 10-seconds of the 15-second clip) and not the entire sample (e.g., not the full 15-second clip). By only generating a probability matrix for the first portion of the sample, the quality of respective information stored at each respective time slice (e.g., a 1 second segment of the portion of the sample) within the first portion of the sample is equally weighed. For example, the information determined for time slices that occur at edges of a time window is not as high-quality because there is less contextual information (e.g., from preceding and/or following time slices) available to the system.

In some embodiments, the system 400 performs downsampling (at downsampling block 403-1) of mixture audio 402 to generate a coarser representation of the mixture audio. The coarser representation of the mixture audio contains less data than the original representation of the mixture audio. In some embodiments, the representation is made coarser using a downsampling technique (as determined by the neural network) to minimize information loss during the downsampling. For example, instead of using a traditional Fourier Transform or a mel-frequency cepstrum (MFC), the system 400 uses a downsampling technique such as max pooling, where a one-dimensional convolution is applied (to reduce the representation of a feature from two samples to one sample). For example, each downsampling block in FIG. 4 comprises a one-dimensional convolution. In some embodiments, each downsampling block is optimized (e.g., as the weights are trained).

In some embodiments, the downsampling is repeated to produce a high-level feature representation. For example, the downsampling (e.g., performing one-dimensional convolutions and decimations) is repeated N times (e.g., for N+1 total downsampling blocks). For example, N is a value between 5 and 20, such as 11. As shown in FIG. 4, the downsampling is repeated at downsampling block 403-11 and downsampling block 403-12. In some embodiments, each downsampling block includes a decimation step that is performed to remove extra (e.g., unnecessary) data, such as the previous representations produced from the previous downsampling blocks (e.g., the previous convolutions).

At the end of the downsampling process, the system reaches the high-level feature representation (e.g., a "global" representation), where convolution 406 is applied, before the representation is upsampled through upsampling blocks 405. In some embodiments, convolution 406 is a one-dimensional convolution.

In some embodiments, the downsampling block 403-11 and upsampling block 405-2 are directly linked by skip connection 404-1. In some embodiments, skip connections 404 (e.g., 404-1 and 404-2) transfer cropped and/or concatenated information directly between the downsampling and upsampling sides of the U-Net. For example, the skip connection 404-1 provides information directly from downsampling block 403-11 to the upsampling block 405-2. In some embodiments, the information transferred over skip connections comprises coarse contextual information (e.g., that is lost by the global information during downsampling). For example, information available at downsampling block 403-11 that is not available in the global information (out of convolution 406) is shared with upsampling block 405-2 using the skip connection 404-1. Similarly, skip connection 404-2 shares information from downsampling block 403-12 with upsampling block 405-1. The upsampling blocks have access to the coarse information (received via skip connections) and the global information (received from convolution 406).

After the high-level feature representation is produced, the representation is upsampled (e.g., at upsampling block 405-1 and upsampling block 405-2). In some embodiments, the number of upsampling blocks is less than the number of downsampling blocks (e.g., and the system does not return the original sampling rate). For example, FIG. 4 illustrates two upsampling blocks, 405-1 and 405-2, and twelve downsampling blocks 403-1 through 403-12. In some embodiments, the upsampling produces more detail of the representation. The upsampling combines the global information output from convolution 406 with the information received via the skip connections (e.g., which includes more detailed information directly from the downsampling block(s)).

After upsampling the representation, convolution 408 is applied to the sample to generate probability matrix 420. One probability matrix 420 is generated for, for example, a 15-second sample of mixture audio 402. The probability matrix 420 includes, for each time slice of the 15-second sample, a plurality of characters and the probability of each character being present at the time slice. For example, the probability matrix includes timing information (e.g., time slices within the sample) and a likelihood of a character occurring at that time. The system identifies the character that is most likely to occur at each time slice. Arranging the most likely characters temporally, the system generates lyrics from the order of the most-likely characters, as determined by probability matrix 420.

In some embodiments, the system 400 uses the probability matrix 420 to transcribe lyrics. For example, the system performs decoding of the matrix to determine words that are most likely created from the character probability matrix 420. In some embodiments, the system displays the lyrics on a device having a display, to a user.

In some embodiments, the system stores the lyrics (e.g., the sequence of characters) determined from probability matrix 420. In some embodiments, the system stores the lyrics and timing information of the lyrics (e.g., when the lyrics occur within the media content item). For example, the lyrics and/or timing information of the lyrics are stored by lyrics module 326 (FIG. 3).

In some embodiments, the system 400 uses the probability matrix 420 to perform alignment of lyrics. For example, the probability matrix 420 includes timing information and character information such that the system 400 determines when characters (e.g., and lyrics) occur within the media content item. In some embodiments, the system receives lyrics (e.g., manually transcribed lyrics) as an additional input to perform the alignment. For example, the system compares the lyrics that are received as an input with the probability matrix. In some embodiments, the system uses the lyrics as an input to determine the sequences of characters in the probability matrix. The system determines times at which characters from the received lyrics occur in the probability matrix, and the associated timing information stored in the probability matrix.

In some embodiments, the lyrics (e.g., characters) determined by the probability matrix (e.g., as transcribed) are aligned and no additional input is used (e.g., the lyrics are not received as an input). In some embodiments, the alignment of the lyrics is displayed with a transcription of the lyrics. For example, in a singalong (e.g., karaoke) mode, the system displays the transcription of the determined lyrics during playback of the media content item, where the lyrics are time-aligned with the audio.

Figure 5:
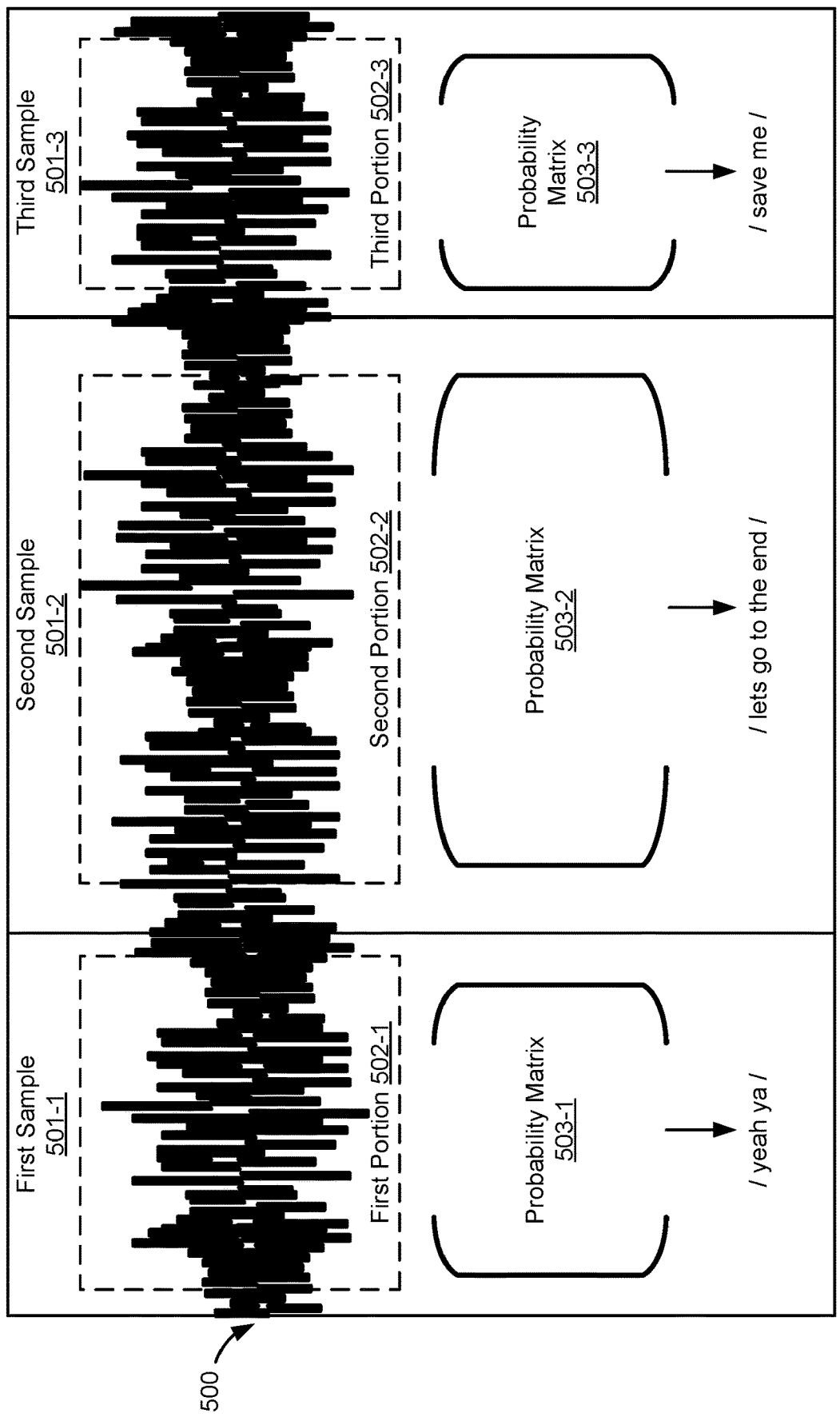
FIG. 5 illustrates identifying lyrics that correspond to portions of audio data, in accordance with some embodiments.

FIG. 5 is a block diagram illustrating a plurality of samples of a media content item. The audio data (e.g., waveform) of media content item 500 is divided into a first sample 501-1, a second sample 501-2 and a third sample 501-3. Within each sample, a portion of the sample is selected. For example, the portion of each sample comprises a middle portion of each sample. For each portion of each sample, a probability matrix 503 (e.g., including character information, timing information, and probabilities) is determined and lyrics are generated for the respective portion of the media content item.

For example, first sample 501-1 comprises a 15-second segment of media content item 500. First portion 502-1 of the first sample 501-1 comprises the middle 10-second segment of the first sample 501-1. It will be recognized that different time segments and/or different portion lengths can be used. For example, the first portion need not be the middle portion of the first sample. For example, the first portion may begin at 1-second into the first sample and end with 2-seconds remaining in the first sample. In some embodiments, the first portion is the same length as the sample.

For the first portion 502-1, probability matrix 503-1 is generated (e.g., using system 400 described in FIG. 4). In some embodiments, probability matrix 503-1 is generated using information from the first sample 501-1. In some embodiments, probability matrix 503-1 is generated using information from additional portions (e.g., second portion 502-2 and/or third portion 502-3) and/or additional samples (e.g., samples 501-1 to 501-3) of the media content item. For example, one or more portions and/or one or more samples of the media content item (e.g., up to the entirety of the media content item 500) are used as inputs to system 400, and the probability matrix 503-1 is generated based on the one or more portions (e.g., including first portion 502-1) and/or the one or more samples (e.g., including first sample 501-1) of the media content item 500. The probability matrix 503-1 includes, for each time slice (e.g., every 0.045 seconds of the first portion 502-1), a plurality of characters and the probability of the character occurring at that time slice. The probability matrix 503-1, when generated, includes, for each respective time slice, contextual information about the time slices preceding and following (e.g., temporally) the respective time slice. For example, the probabilities represented in probability matrix 503-1 reflect the contextual information about the other time slices. In some embodiments, the electronic device determines the character with the highest probability for each time slice in the first portion. As illustrated in FIG. 5, the characters determined from probability matrix 503-1 correspond to "yeah ya." For example, the first time slice was determined to correspond to a "y" and the last time slice was determined to correspond to an "a" in the first portion. Arranging the determined characters (based on their probabilities in the probability matrix), the electronic device generates lyrics ("yeah ya") for the first portion 502-1. In some embodiments, the first time slice and/or the last time slice corresponds to a blank (e.g., a space), for example, to indicate silence before and/or after lyrics.

Similarly, a probability matrix 503-2 is generated for a second portion 502-2 of a second sample 501-2. The electronic device generates the lyrics "lets go to the end" for the second portion 502-2. For third sample 501-3, the lyrics "save me" are generated based on probability matrix 503-3. In some embodiments, the probability matrices 503-1, 503-2, and 503-3 are concatenated together to generate a single probability matrix (e.g., corresponding to the length of the audio data received as an input). In some embodiments, the sequence of characters is determined based on (e.g., after determination of) the concatenated probability matrix. For example, instead of determining the character with the highest probability for each time slice for each probability matrix 501, the sequence of characters is determined from the single probability matrix (e.g., to include contextual data from the plurality of probability matrices 503-1 to 501-3).

In some embodiments, samples 501 and/or portions 502 of a media content item overlap. For example, samples of a media content item overlap such that the entire media content item is represented by portions (e.g., middle portions) of the samples.

In some embodiments, samples 501 and/or portions 502 are the same length. In some embodiments, samples 501 and/or portions 502 are different lengths.

Figure 6A:
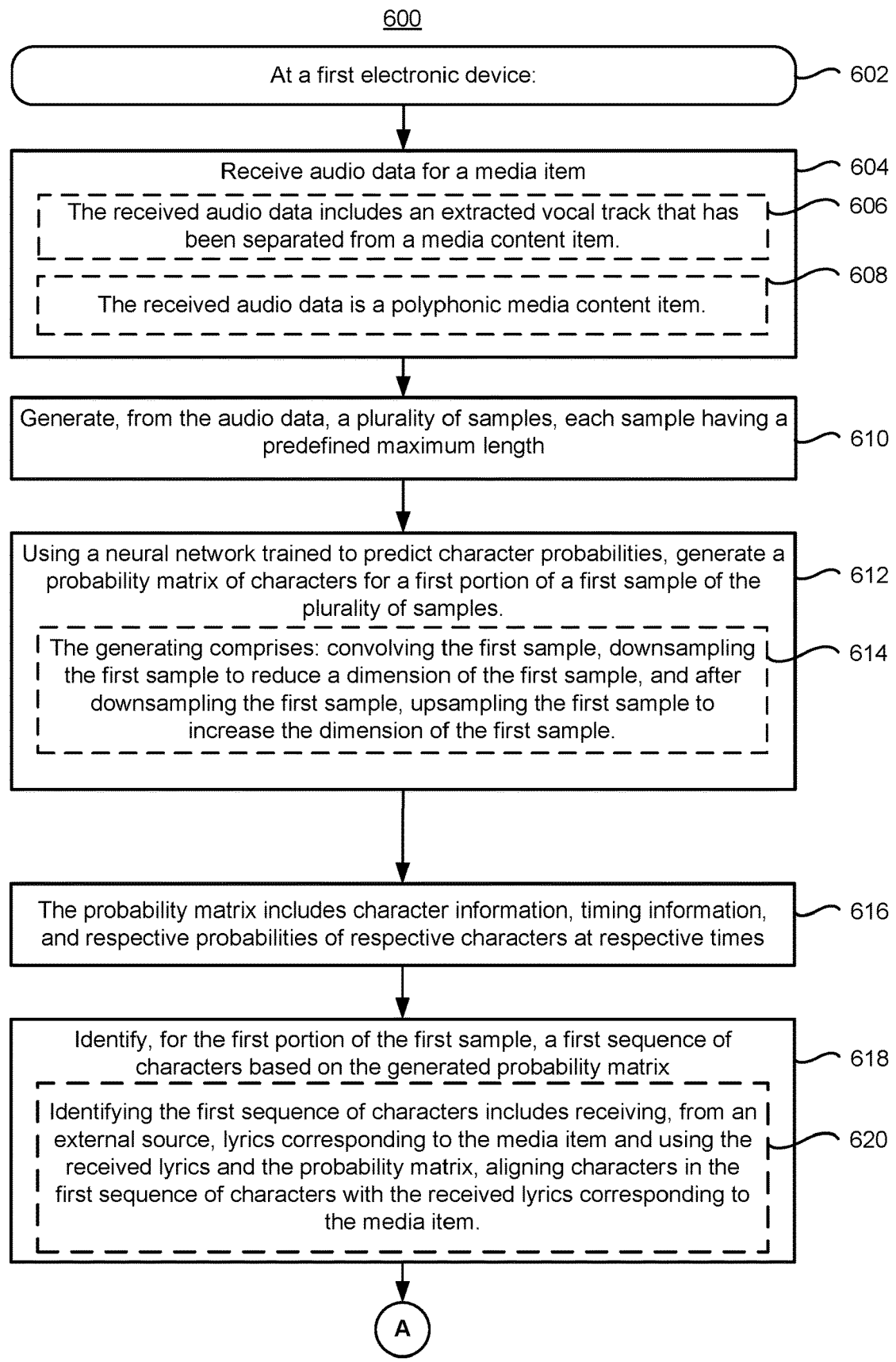
FIGS. 6A-6B are flow diagrams illustrating a method of identifying a sequence of characters from a probability matrix, in accordance with some embodiments.
Figure 6B:
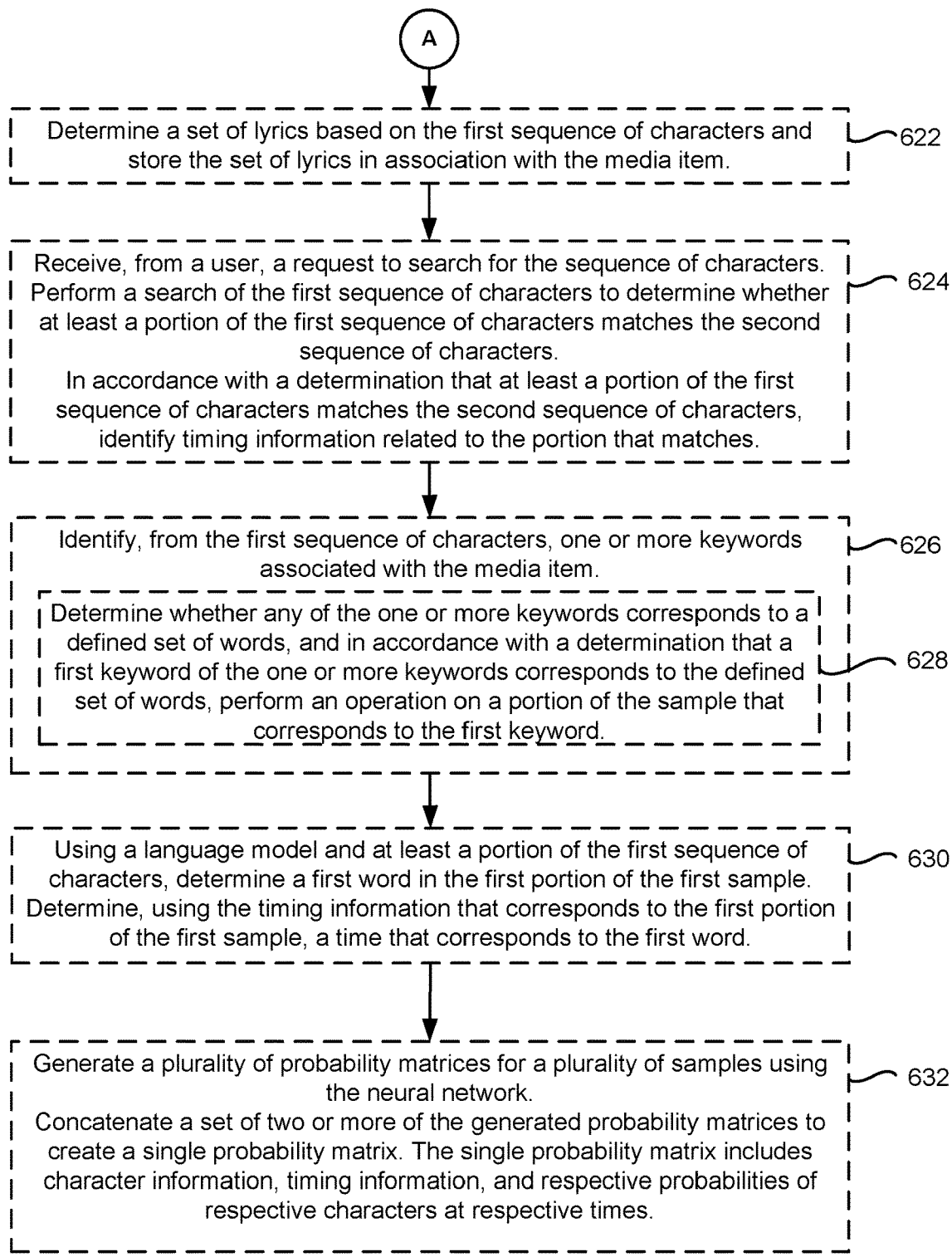

FIGS. 6A-6B are flow diagrams illustrating a method 600 for identifying a first sequence of characters based on a generated probability matrix, in accordance with some embodiments. Method 600 may be performed (602) at a first electronic device (e.g., server 104 and/or electronic device 102-1, the electronic device having one or more processors and memory storing instructions for execution by the one or more processors. In some embodiments, the method 600 is performed by executing instructions stored in the memory (e.g., memory 306, FIG. 3 and/or memory 212, FIG. 2) of the electronic device. In some embodiments, the method 600 is performed by a combination of the server system (e.g., including media content server 104 and CDN 106) and an electronic device (e.g., a client device). In some embodiments, the server system provides tracks (e.g., media items) for playback to the electronic device(s) 102 of the media content delivery system 100.

Referring now to FIG. 6A, in performing the method 600, the electronic device receives (604) audio data (e.g., an audio waveform) for a media item. For example, the audio data comprises mixture audio 402 that is received as an input to system 400 in FIG. 4.

In some embodiments, the received audio data includes (606) an extracted vocal track that has been separated from a media content item. For example, the vocal track includes vocals that have been separated from the music.

In some embodiments, the received audio data is (608) a polyphonic media content item (e.g., that includes a vocal track and an instrumental track). In some embodiments, the electronic device performs the separation of the vocal track (e.g., the electronic device receives mixture audio 402 and separates the vocal track before downsampling the vocal track only). In some embodiments, the system 400 performs the downsampling and upsampling on the polyphonic media content item (e.g., without separating the vocal track from the instrumental track).

The electronic device generates (610), from the audio data, a plurality of samples, each sample having a predefined maximum length. For example, the plurality of samples comprise 15-second clips. In some embodiments, the plurality of samples have the same predefined length. In some embodiments, the plurality of samples have different lengths (within the predefined maximum length). For example, as shown in FIG. 5, samples 501-1, 501-2, and 501-3 have various lengths.

Using a neural network trained to predict character probabilities, the electronic device generates (612) a probability matrix of characters for a first portion of a first sample of the plurality of samples. As illustrated in FIG. 5, the first sample 501-1 includes a first portion 502-1. In some embodiments, the first portion is a middle portion of the first sample. For example, the first portion is the middle 10-seconds of the 15-second first sample.

In some embodiments, generating the matrix using the neural network comprises (614) convolving the first sample, downsampling the first sample to reduce a dimension of the first sample, and after downsampling the first sample, upsampling the first sample to increase the dimension of the first sample. For example, downsampling and upsampling the representations occurs as described with regard to FIG. 4.

The probability matrix includes (616) character information, timing information, and respective probabilities of respective characters at respective times. For example, the first sample comprises a plurality of time slices (e.g., a one-second portion of the sample corresponds to a time slice). In some embodiments, the timing information corresponds to the time slice (e.g., the timing information indicates a time, such as an identifier of a time slice, within the received audio data, within the first sample, and/or within a portion of the first sample). For each time slice (e.g., identified by the timing information), a plurality of characters (e.g., character information) is stored in the probability matrix. For example, the plurality of characters include the lower-case letters of the English alphabet, a whitespace, and an apostrophe. In some embodiments, the plurality of characters includes one or more symbols from another alphabet, for example, the Greek alphabet. For example, the plurality of characters includes the Epsilon (ε) symbol to indicate periods of time with no vocals (e.g., an extended whitespace). Each character of the plurality of characters is associated with a respective probability (e.g., indicating the likelihood of the character being present at that time slice). In some embodiments, the probability matrix uses contextual information of portions of segments that occur temporally before and/or after the first portion of the first segment (e.g., the respective probabilities are generated based in part on the contextual information of other portions of segments).

The electronic device identifies (618), for the first portion of the first sample, a first sequence of characters based on the generated probability matrix. For example, as illustrated in FIG. 5, the probability matrix generated for first portion 502-1, includes character information, and the electronic device selects the most likely character (e.g., having the greatest probability) for each time slice in the first portion of the first sample. The electronic device, for example, identifies, for the first portion, the sequence of letters corresponding to "yeah ya."

In some embodiments, identifying the first sequence of characters includes (620) receiving, from an external source, lyrics corresponding to the media item and using the received lyrics and the probability matrix, aligning characters in the first sequence of characters with the received lyrics corresponding to the media item. For example, the electronic device matches the characters (as determined in the probability matrix) to lyrics received as an input. In some embodiments, the identifying the first sequence of characters includes using a best path (e.g., Viterbi) forced alignment. In some embodiments, the lyrics received from the external source are processed (e.g., to represent characters that can be aligned with the characters of the first sequence of characters).

In some embodiments, the electronic device determines (622) a set of lyrics based on the first sequence of characters and stores the set of lyrics in association with the media item.

In some embodiments, the electronic device displays, for a user, the first sequence of characters with at least a portion of the audio data, wherein the first sequence of characters is time-aligned with the portion of the audio data. For example, the electronic device displays the sequence of characters (e.g., lyrics) aligned with the portion of the audio that is currently playing to enable a user to sing along (e.g., karaoke). For example, when media content item 500 is played back to the user (e.g., at electronic device 102), the server 104 causes the electronic device 102 to display the sequence of characters corresponding to the currently played back portion of the media content item. The electronic device displays the lyrics "yeah ya" while the first sample 501-1 of media item 500 is playing. The electronic device then displays the lyrics "lets go to the end" while the second sample 501-2 of media item 500 is playing. In some embodiments, the electronic device displays one word (e.g., of the lyrics determined from the probability matrix) to the user at a time.

In some embodiments, the electronic device (e.g., media server 104 and/or electronic device 102) trains (e.g., before using) the neural network using training data. For example, the system 400 is trained using training data. In some embodiments, the training data includes identified line breaks. In some embodiments, a highly accurate alignment is not necessary to train the data and only line-level alignment is used. For example, the electronic device receives line breaks of the lyrics within the audio data as part of the training process.

In some embodiments, a first character in the first sequence of characters corresponds to a blank character. In some embodiments, the set of available characters included in the character probability matrix includes a blank symbol (e.g., the space between "yeah ya" is represented in the probability matrix, FIG. 5). For example, a "break" with no vocals, words, and/or alphanumeric characters is included in the sequence of characters. In some embodiments, a symbol (e.g., ε) is used to indicate "breaks" (e.g., breaks that are present for more than a threshold period of time) with no vocals, words, and/or alphanumeric characters.

In some embodiments, the electronic device receives (624), from a user, a request to search for a second sequence of characters within the media item. For example, media content server 104 receives a search request that is input via an input device 208 of electronic device 102. In response to receiving the request to search for the sequence of characters, the electronic device (e.g., media content server 104 and/or electronic device 102) performs a search of the first sequence of characters to determine whether at least a portion of the first sequence of characters matches the second sequence of characters. For example, the user requests to search for the sequence of characters "to the end," and in response to the request, the electronic device searches media content item 500 and determines that at least a portion of the first sequence of characters "lets go to the end", identified from probability matrix 503-2, matches the requested "to the end." In accordance with a determination that at least a portion of the first sequence of characters matches the second sequence of characters, the electronic device identifies timing information related to the portion that matches. For example, the electronic device identifies timing information stored in probability matrix 503-2 that corresponds to the matched portion of the sequence of characters, "to the end." In some embodiments, the electronic device provides the matched portion of the sequence of characters to the user. For example, the media content item is played back, for the user, starting at the time in the media content item that includes "to the end," as requested by the user. In some embodiments, a user requests the electronic device to search the lyrics for a requested word (or words) and the electronic device skips to a time within the media content item that matches the requested word (or words) within the lyrics.

In some embodiments, the electronic device identifies (626), from the first sequence of characters, one or more keywords associated with the media item.

In some embodiments, the electronic device determines (628) whether any of the one or more keywords corresponds to a defined set of words (e.g., explicit words). In accordance with a determination that a first keyword of the one or more keywords corresponds to the defined set of words, the electronic device performs an operation on a portion of the sample that corresponds to the first keyword. For example, the electronic device automatically removes audio data from the portion of the sample. For example, identified explicit words are removed from an audio track for the purpose of radio-editing.

In some embodiments, the electronic device, using a language model and at least a portion of the first sequence of characters identified from the probability matrix, determines (630) a first word in the first portion of the first sample. The electronic device determines, using the timing information that corresponds to the first portion of the first sample, a time that corresponds to the first word. In some embodiments, the electronic device outputs (e.g., during playback of the media item) the first word for display at a time within the media item that corresponds to the time determined for the first word. For example, the electronic device combines the probability matrix with a language model to transcribe the audio data of the media item into textual lyrics. In some embodiments, the electronic device transcribes the first sequence of characters and determines, from the transcription, where in time particular words occur within the sample. For example, the electronic device displays the first word at the time the first word occurs in the media content item during playback. In some embodiments, a plurality of words is determined using the language model and at least a portion of the first sequence of characters. For example, the electronic device generates, from the sample 501-2, a set of lyrics having a plurality of words, such as "lets go to the end". In some embodiments, the electronic device time-aligns the first sequence of characters (e.g., or word(s)) to the audio data of the media item and outputs the time-aligned first sequence of characters (e.g., or word(s)) for display.

In some embodiments, the electronic device generates (632) a plurality of probability matrices for a plurality of samples using the neural network and concatenates a set of two or more of the generated probability matrices to create a single probability matrix. The single probability matrix includes character information, timing information, and respective probabilities of respective characters at respective times. For example, FIG. 5 illustrates three probability matrices 503-1 through 503-3. In some embodiments, the three probability matrices are combined into one probability matrix. In this way, the amount of information available for predicting and/or matching lyrics is increased. In some embodiments, the electronic device identifies the first sequence of characters using the single probability matrix.

Using a neural network that can automatically determine lyrics for a media item from an audio waveform reduces input required from a user (e.g., by enabling a user to provide only an indication of media content instead of searching for sources of lyrics that have been manually transcribed or attempting to manually transcribe the lyrics themselves). Reducing the number of inputs required to access to lyrics for a media content item increases the efficiency of the device (e.g., by reducing the need for the user to peruse the Internet for other sources of lyrics for the media content item, selecting and/or listening to a media content item repeatedly in order to identify and/or transcribe the lyrics). Further, using a neural network that uses the audio waveform of the media content item as an input decreases the processing power required by the device (e.g., by eliminating the step of separating a vocal track from the non-vocal track before performing speech processing on the separated vocal track). Using a neural network trained on mixed audio data also increases the efficiency and accuracy of identifying the lyrics (e.g., as compared to using a traditional speech processing model), without the need for manual intervention (e.g., manual transcription). Increasing the efficiency with which a media-providing service identifies lyrics from a media content item reduces the processing power required to generate such results (e.g., by reducing the amount of user interaction required).

Although FIGS. 6A-6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:
1. A method, comprising:
at an electronic device having one or more processors and memory storing instructions for execution by the one or more processors:
receiving audio data for a media item;
generating, from the audio data, a plurality of samples, each sample having a predefined maximum length;
using a neural network trained to predict character probabilities, generating a plurality of probability matrices for the plurality of samples, including, for a respective sample of the plurality of samples, generating a probability matrix of characters for the respective sample of the plurality of samples, including:

downsampling at least a portion of the respective sample to reduce a dimension of the respective sample;
convolving an output of the downsampling of the respective sample; and
upsampling an output of the convolution of the first respective sample to increase the dimension of the respective sample;
wherein the probability matrix includes:
character information,
timing information, and
respective probabilities of respective characters at respective times;
concatenating a set of two or more of the plurality of probability matrices to create a single probability matrix, the single probability matrix including:
character information,
timing information, and
respective probabilities of respective characters at respective times; and
identifying a first sequence of characters using the single probability matrix.

2. The method of claim 1, wherein identifying the first sequence of characters includes:
receiving, from an external source, lyrics corresponding to the media item; and
using the received lyrics and the single probability matrix, aligning characters in the first sequence of characters with the received lyrics corresponding to the media item.

3. The method of claim 1, further comprising:
determining a set of lyrics based on the first sequence of characters; and
storing the set of lyrics in association with the media item.

4. The method of claim 1, further comprising:
using a language model and at least a portion of the first sequence of characters, determining a first word in a first sample; and
determining, using the timing information that corresponds to the first sample, a time that corresponds to the first word.

5. The method of claim 1, wherein the received audio data includes an extracted vocal track that has been separated from a media content item.

6. The method of claim 1, wherein the received audio data is a polyphonic media content item.

7. The method of claim 1, further comprising:
receiving, from a user, a request to search for a second sequence of characters within the media item;
in response to receiving the request to search for the second sequence of characters, performing a search of the first sequence of characters to determine whether at least a portion of the first sequence of characters matches the second sequence of characters; and
in accordance with a determination that at least a portion of the first sequence of characters matches the second sequence of characters, identifying timing information related to the portion that matches.

8. The method of claim 1, further comprising:
identifying, from the first sequence of characters, one or more keywords associated with the media item.

9. The method of claim 8, further comprising:
determining whether any of the one or more keywords corresponds to a defined set of words; and
in accordance with a determination that a first keyword of the one or more keywords corresponds to the defined set of words, performing an operation on a portion of the sample that corresponds to the first keyword.

10. A first electronic device comprising:
one or more processors; and
memory storing instructions for execution by the one or more processors, the instructions including instructions for:
receiving audio data for a media item;
generating, from the audio data, a plurality of samples, each sample having a predefined maximum length;
using a neural network trained to predict character probabilities, generating a plurality of probability matrices for the plurality of samples, including, for a respective sample of the plurality of samples, generating a probability matrix of characters for the respective sample of the plurality of samples, including:
downsampling at least a portion of the respective sample to reduce a dimension of the respective sample;
convolving an output of the downsampling of the first respective sample; and
upsampling an output of the convolution of the first respective sample to increase the dimension of the respective sample;
wherein the probability matrix includes:
character information,
timing information, and
respective probabilities of respective characters at respective times;
concatenating a set of two or more of the plurality of probability matrices to create a single probability matrix, the single probability matrix including:
character information,
timing information, and
respective probabilities of respective characters at respective times; and
identifying a first sequence of characters using the single probability matrix.

11. A non-transitory computer-readable storage medium storing instructions that, when executed by an electronic device, cause the electronic device to:
receive audio data for a media item;
generate, from the audio data, a plurality of samples, each sample having a predefined maximum length;
using a neural network trained to predict character probabilities, generate a plurality of probability matrices for the plurality of samples, including, for a respective sample of the plurality of samples, generating a probability matrix of characters for the respective sample of the plurality of samples, including:
downsampling at least a portion of the respective sample to reduce a dimension of the respective sample;
convolving an output of the downsampling of the respective sample; and
upsampling an output of the convolution of the respective sample to increase the dimension of the first respective sample;
wherein the probability matrix includes:
character information,
timing information, and
respective probabilities of respective characters at respective times;
concatenate a set of two or more of the plurality of probability matrices to create a single probability matrix, the single probability matrix including:

character information,
timing information, and
respective probabilities of respective characters at respective times; and
identify a first sequence of characters using the generated single probability matrix.

12. The electronic device of claim 10, wherein identifying the first sequence of characters includes:
receiving, from an external source, lyrics corresponding to the media item; and
using the received lyrics and the single probability matrix, aligning characters in the first sequence of characters with the received lyrics corresponding to the media item.

13. The electronic device of claim 10, the one or more programs further including instructions for:
determining a set of lyrics based on the first sequence of characters; and
storing the set of lyrics in association with the media item.

14. The electronic device of claim 10, the one or more programs further including instructions for:
using a language model and at least a portion of the first sequence of characters, determining a first word in a first sample; and
determining, using the timing information that corresponds to the first sample, a time that corresponds to the first word.

15. The electronic device of claim 10, wherein the received audio data includes an extracted vocal track that has been separated from a media content item.

16. The electronic device of claim 10, wherein the received audio data is a polyphonic media content item.

17. The electronic device of claim 10, the one or more programs further including instructions for:
receiving, from a user, a request to search for a second sequence of characters within the media item;
in response to receiving the request to search for the second sequence of characters, performing a search of the first sequence of characters to determine whether at least a portion of the first sequence of characters matches the second sequence of characters; and
in accordance with a determination that at least a portion of the first sequence of characters matches the second sequence of characters, identifying timing information related to the portion that matches.

\* \* \* \* \*

UNITED STATES PATENT AND TRADEMARK OFFICE
CERTIFICATE OF CORRECTION

PATENT NO. : 11,308,943 B2
APPLICATION NO. : 16/569372
DATED : April 19, 2022
INVENTOR(S) : Stoller et al.

Page 1 of 1

It is certified that error appears in the above-identified patent and that said Letters Patent is hereby corrected as shown below:

In the Claims

Claim 1, Column 19, Lines 6-7, delete "of the first respective sample" and insert --of the respective sample--;

Claim 10, Column 20, Lines 21-22, delete "of the first respective sample" and insert --of the respective sample--;

Claim 10, Column 20, Lines 23-24, delete "of the first respective sample" and insert --of the respective sample--;

Claim 11, Column 20, Lines 58-59, delete "of the first respective sample" and insert --of the respective sample--;

Claim 11, Column 21, Lines 5-6, delete "the generated single probability" and insert --the single probability--.

Signed and Sealed this
Twenty-first Day of June, 2022

Katherine Kelly Vidal
*Director of the United States Patent and Trademark Office*